United States Patent [19]
Wenger

[11] 4,235,064
[45] Nov. 25, 1980

[54] BAGGER

[75] Inventor: Harvey M. Wenger, Holland, Mich.

[73] Assignee: Wilfred O. Schmidt, Grand Rapids, Mich.

[21] Appl. No.: 881,809

[22] Filed: Feb. 27, 1978

[51] Int. Cl.³ .............................................. B65B 9/08
[52] U.S. Cl. ....................................... 53/451; 53/552
[58] Field of Search ................ 53/551, 552, 554, 555, 53/451

[56] References Cited

U.S. PATENT DOCUMENTS

| 2,529,732 | 11/1950 | Howard | 53/551 X |
| 3,340,129 | 9/1967 | Grevich | 53/552 X |
| 3,431,700 | 3/1969 | Rausing et al. | 53/552 |

Primary Examiner—Travis S. McGehee
Attorney, Agent, or Firm—Wilfred O. Schmidt

[57] ABSTRACT

A bagger for automatically forming and sealing a plurality of bags of predetermined size and filled by a predetermined weight of content from a single, continuous plastic sheet.

6 Claims, 9 Drawing Figures

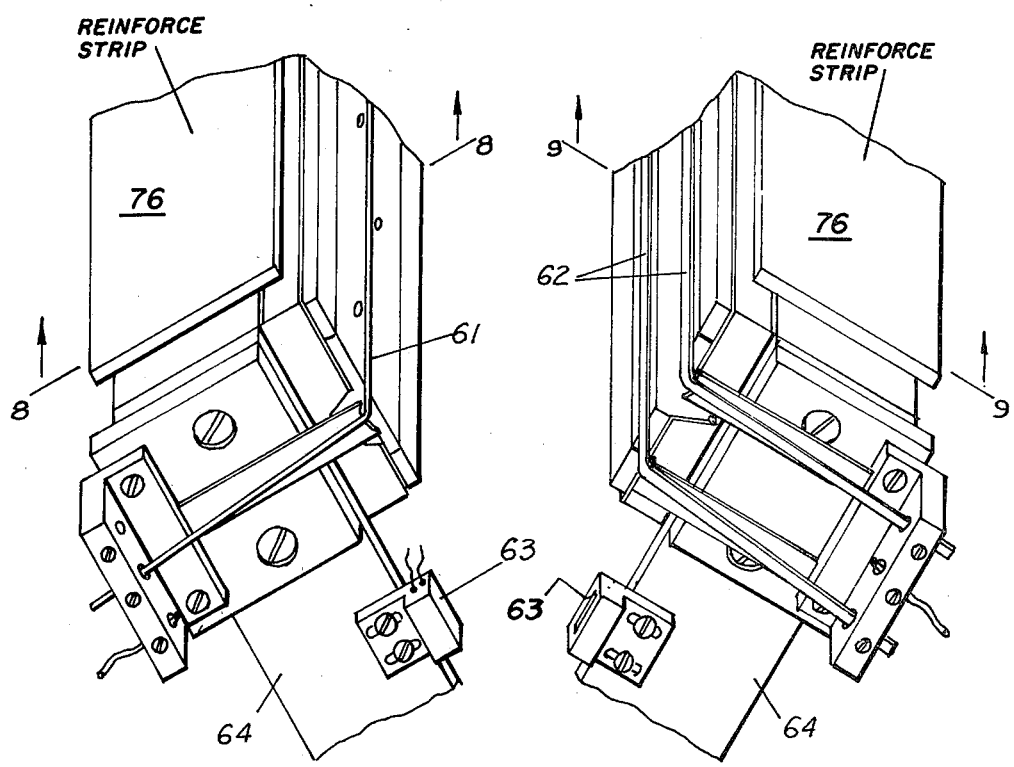
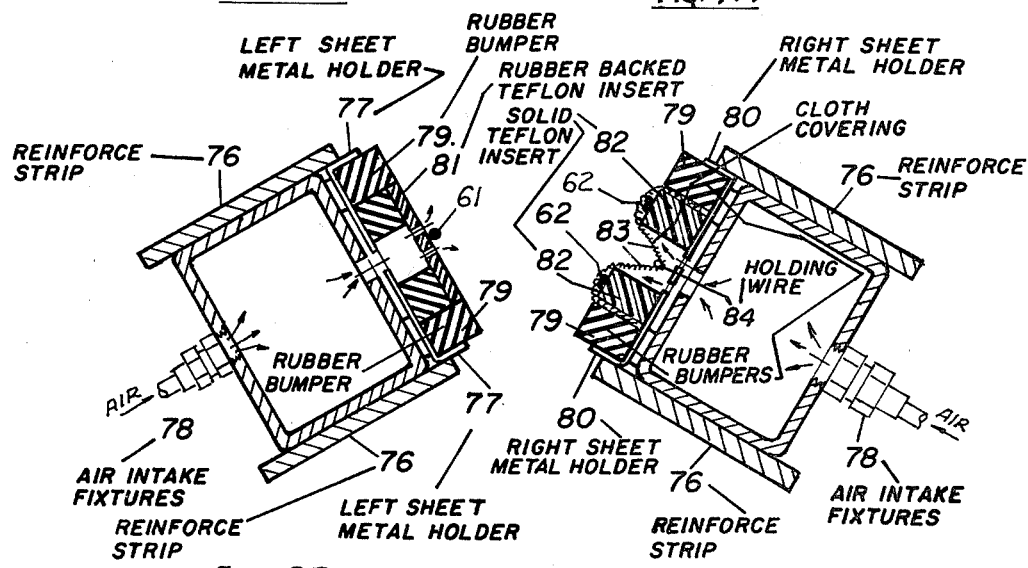

4,235,064

BAGGER

SUMMARY OF INVENTION

This invention relates to a bag forming, filling and sealing machine for forming a bag from a single continuous sheet of thermoplastic material as for example polyethylene or polypropylene or materials which are similarly heat and pressure sealable. The machine contemplates a flat roll of thin sheet material having a sheet thickness up to 10 mils. The machine has the capacity to handle bags in the size from 8"×10" to 30"×30" made successively from the single continuous sheet of thermoplastic material at the rate of 8 to 10 bags per minute.

The principle of operation of the machine is dependent upon gravity. First in the filling process where the granular material flows from the supply hopper to the scale hopper into the newly formed bag. Second, in keeping the single, continuous sheet under proper tension when the granular material filled bag is advanced by means of powered rollers from the bag forming position to the secondary position. This advancement, as the result of the newly formed bag being yet contiguous, simultaneously provides a new sheet of material in the bag forming position to repeat the bag forming cycle.

To avoid spillage and loss of material while in operation, the machine has incorporated certain positive constraints:

The granular material will not flow from the supply hopper 11 to the scale hopper 12 unless:

1. The bag occupying the bag secondary position 59 has been severed from the folded continuous sheet and released by the horizontal clamp 21B; and
2. The bag occupying the bag forming position 58 has been released by both the vertical clamp 21A and the horizontal clamp 21B and lowered to the bag secondary position 59; and
3. A sufficient length of the folded continuous sheet has been advanced into the bag forming position 59 while under the tension induced by the weight contained in the immediately released bag then being lowered to the bag secondary position 59.

The granular material will not flow from the scale hopper into the bag held by the vertical clamp 21A and horizontal clamp 21B in the bag forming position 58 unless:

1. The weight of the granular material in the scale hopper equals the predetermined measure preset on the digital scale 33; and
2. The vertical clamp 21A and the horizontal clamp 21B are held closed under a given pressure; and
3. The conveyor 22 has been raised and in turn has raised the horizontal clamp 21B thereby relieving the stress induced in the clamped, folded, continuous sheet and thereby dilating the held bag to recieve the flow of material from the scale hopper 12.

The bag held by the vertical clamp 21A and the horizontal clamp 21B in the bag forming position 58 will not be released by the said clamps unless:

1. The granular material in the scale hopper 12 has been completely evacuated into the bag held in the bag forming position 58; and
2. A three second cooling period for cooling the seams of the held bag has expired.

It is the object of the invention to provide an apparatus for producing bags on demand from a continuous thermoplastic sheet.

Another object is to provide an apparatus for filling the bag a predetermined weight of material while held by mechanical means, and concurrently seal the sides and bottom edge thereof.

A further object of the invention is to utilize the ballast effect of the filled bag to hold the continuous thermoplastic sheet under tension while advancing a sufficient length necessary for the succeeding bag forming cycle.

It is the prime object to provide a process and apparatus for successively producing formed, filled and sealed bags on demand from a continuous thermoplastic sheet.

These and other objects and advantages of the invention will more fully appear from the following description made in connection with the accompanying drawings whereas like referred numbers refer to the same or similar parts throughout the several views.

DESCRIPTION OF THE DRAWINGS

FIG. 6A. Partial illustration of the left jaw face and cutting wire.

FIG. 6B. Cross sectional view of the left jaw face on line 8—8.

FIG. 7A. Partial illustration of the right jaw face typical for both vertical and horizontal jaws.

FIG. 7B. Cross sectional view of the right jaw on line 9—9.

DESCRIPTION OF THE PREFERRED EMBODIMENT

Figure 1:
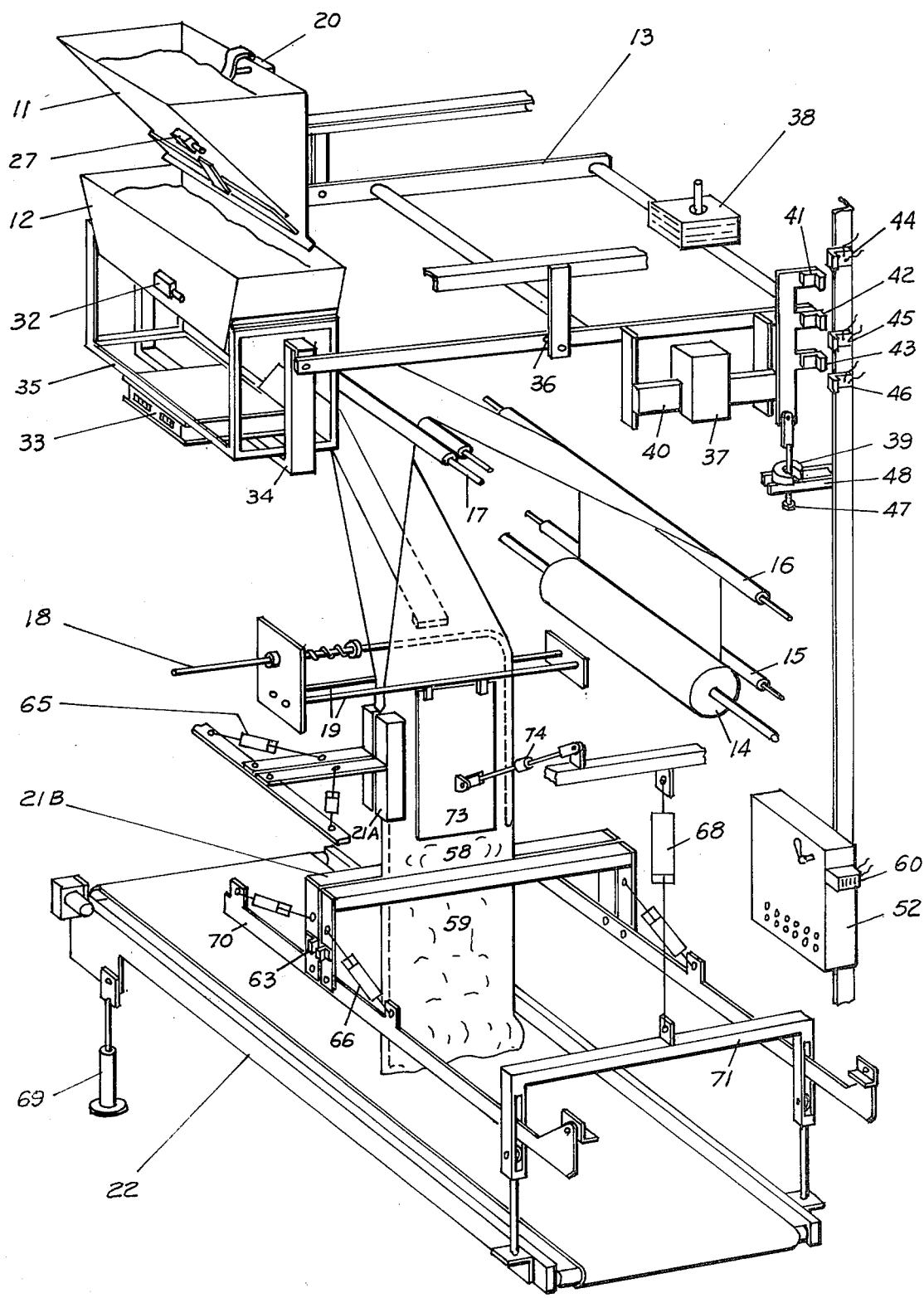
FIG. 1. Elevational view of the bagger with the frame broken away.
Figure 2:
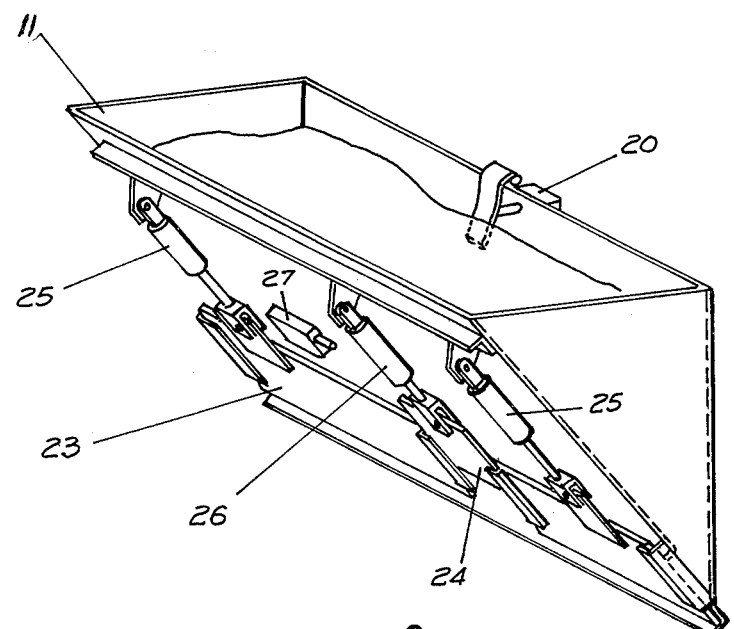
FIG. 2. Pictorial view of the supply hopper with the dribble gate open.
Figure 3:
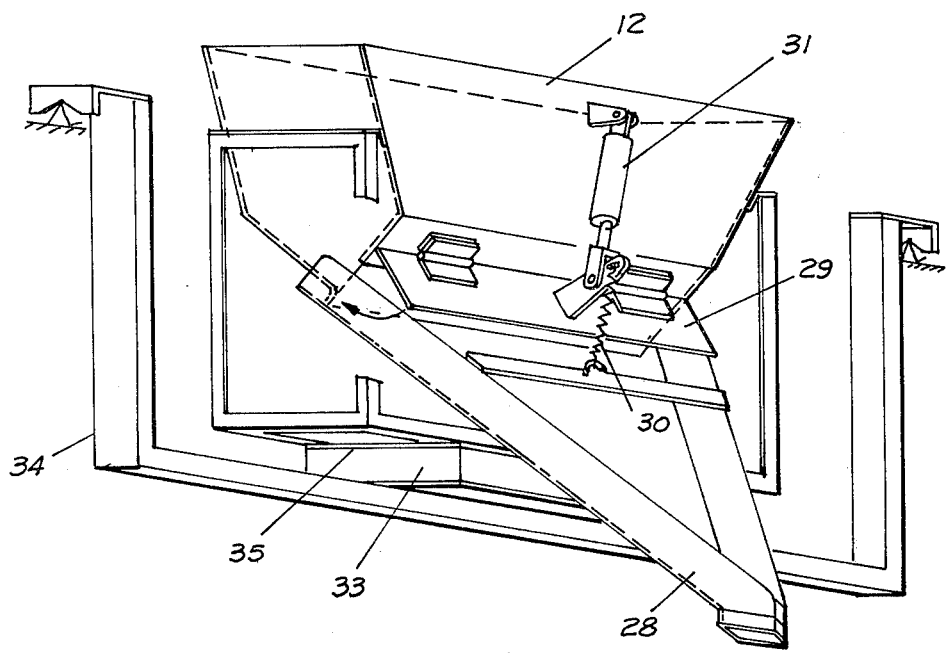
FIG. 3. Pictorial view of the scale hopper with the dump gate open.

Referring to FIG. 1, the embodiment of the invention can be divided into three (3) parts.

Hopper Arrangement—the supply hopper 11 and the scale hopper 12 operatively connected to a weighing mechanism 13; and Bag Forming Combination—the supply of a continuous thermoplastic sheet folded by a centerfold rod 18 in combination with the plurality of guide rods 19 and clamped to form a bag by the vertical clamp 21A and horizontal clamp 21B; and Bag Advancement and Removal Components—the sheet advancing rollers 17 lower the newly formed and filled bag to the bag secondary position 59 and by means of the horizontal clamp 21B seal the open end thereof and sever the said bag from the folded continuous sheet for removal by the conveyor 22.

HOPPER ARRANGEMENT

The supply and scale hopper arrangements of the present invention is illustrated in FIGS. 1—4. The supply hopper 11 is of a right triangular cross section with the sides adjacent the right triangle lying in the vertical and horizontal planes. At the tip of the downwardly pointing vertex is the fast fill gate 23, an aperture of given width, extending the length of the hopper 11. The closure platen for the fast fill gate 23 is slidably mounted on hopper 11 and is normally held in the closed position by the two double acting air cylinders 25. The dribble gate 24 is a rectangular indentation centrally located on the lower edge of the fast fill gate 23 closure platen. In turn, the closure platen for the dribble gate 24 is slidably mounted on the closure platen for the fast fill gate 23, and is normally held closed by the single double acting air cylinder 26.

A feeler switch 20 is mounted at the top of the supply hopper 11, and monitors the level of the material contained in the said hopper. In the event the level of material is less than desired, an independent circuit (not shown), consisting of a motorized auger, is activated and material sufficient to attain the desired level is added to the said hopper.

A vibratory feeder 27 is mounted on the said supply hopper 11 to accelerate the flow of material into the scale hopper 12.

The scale hopper 12 is of the same length, and is situated to receive the flow of material from the supply hopper 11. The scale hopper 12 is of a pentagon cross section with one side lying in the horizontal plane. At the tip of the downwardly pointing vertex, opposite the said horizontal side, is the dump gate 29, an aperture of given width, extending the length of the hopper 12. The closure platen for the dump gate 29 is mounted to swing outwardly and is normally held closed by the double acting air cylinder 31; the said platen is additionally held in the closed position by a spring 30. A vibratory feeder 32 is mounted on the said scale hopper 12 to accelerate the flow of material.

A chute 28 is disposed to collect the flow of material from the scale hopper 12, and by tapering to a spout, the said chute 28, concentrates the flow to facilitate the bag filling procedure.

WEIGHING MECHANISM

Figure 4:
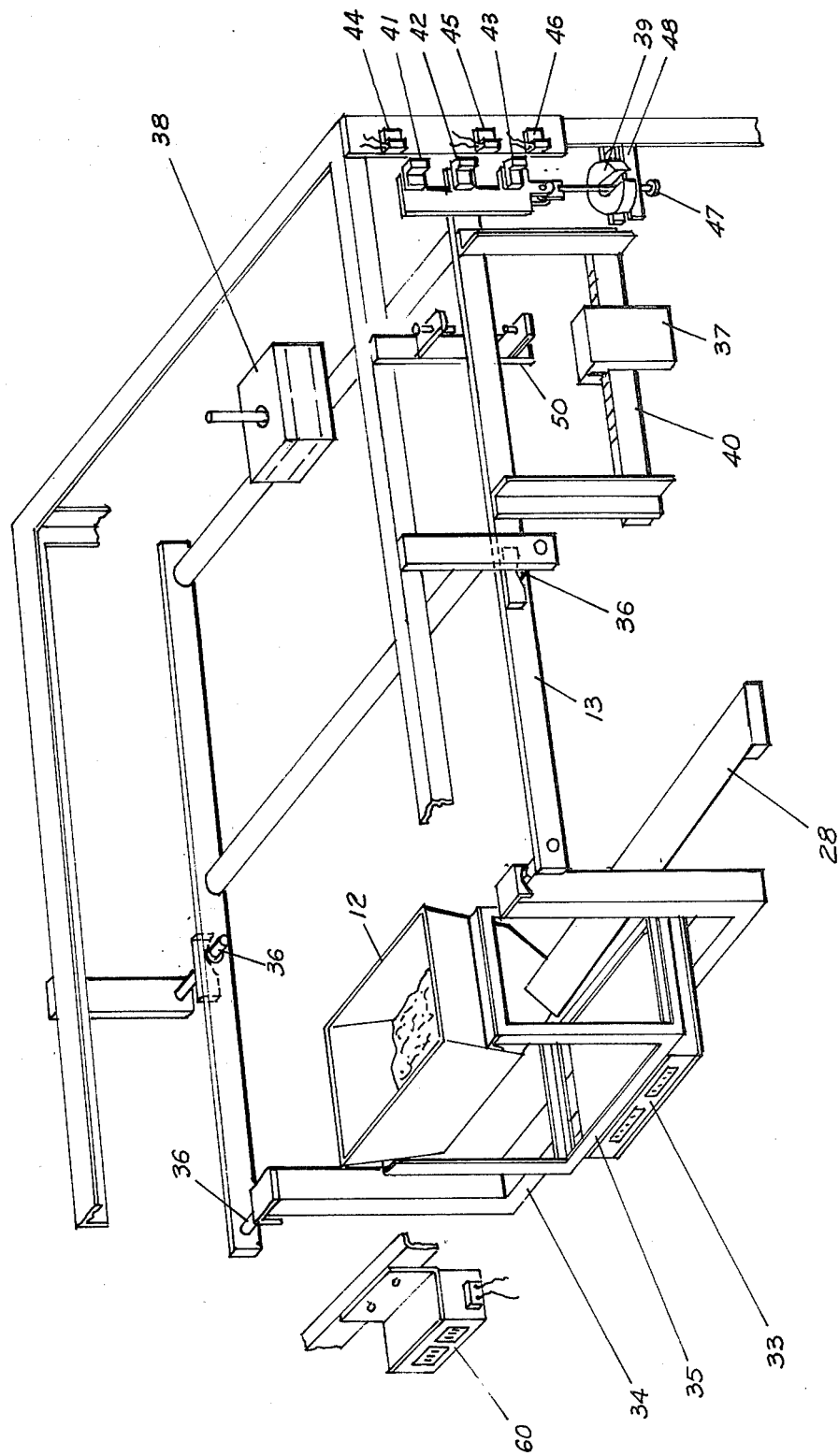
FIG. 4. Schematic illustration of the weighing mechanism.

The weighing mechanism 13 of the present invention is illustrated in FIG. 4. The digital scale 33, the platform support 34, the platform 35, and the scale hopper 12, with the chute 28 fastened to the said platform 35, are situated on one side of the pivot 36. The near weight 37, scale hopper weight 38 and dribble weight 39, along with the beam uppermost contactor 41, the upper contactor 42, the lower contactor 43, and the pick up connector 47, are situated on the other side of pivot 36.

The scale hopper 12 is first balanced when empty with the dribble weight 39 removed, and the near weight 37 is moved to a position on the graduated beam 40, nearest the pivot 36. The balance is attained by adjusting the weight of the scale hopper weight 38. When the balance has been attained, the scale 33 is calibrated to read zero.

In the balanced state the circuits of the beam uppermost contactor 41, upper contactor 42, and lower contactor 43 will be open. A pick up connector 47 is flexibly mounted directly under the said beam contactors 41, 42, and 43. The said connector 47 extends downwardly for reciprocal movement through a pedestal 48. A removeable dribble weight 39, adapted to be lifted by the inverted T shaped end of the pick up connector 47, rests on the pedestal 48 during bagger operation.

A digital counter 60 is mounted on the frame of the bagger and is connected to register each time the scale hopper 12 is emptied of material, thereby counting the number of bags filled. In automatic operation the counter 60 is preset to a given number of times that the scale hopper 12 is to be emptied of material; after such number has been accomplished, the bagger is automatically shut down.

BAG FORMING COMBINATION

Figure 5:
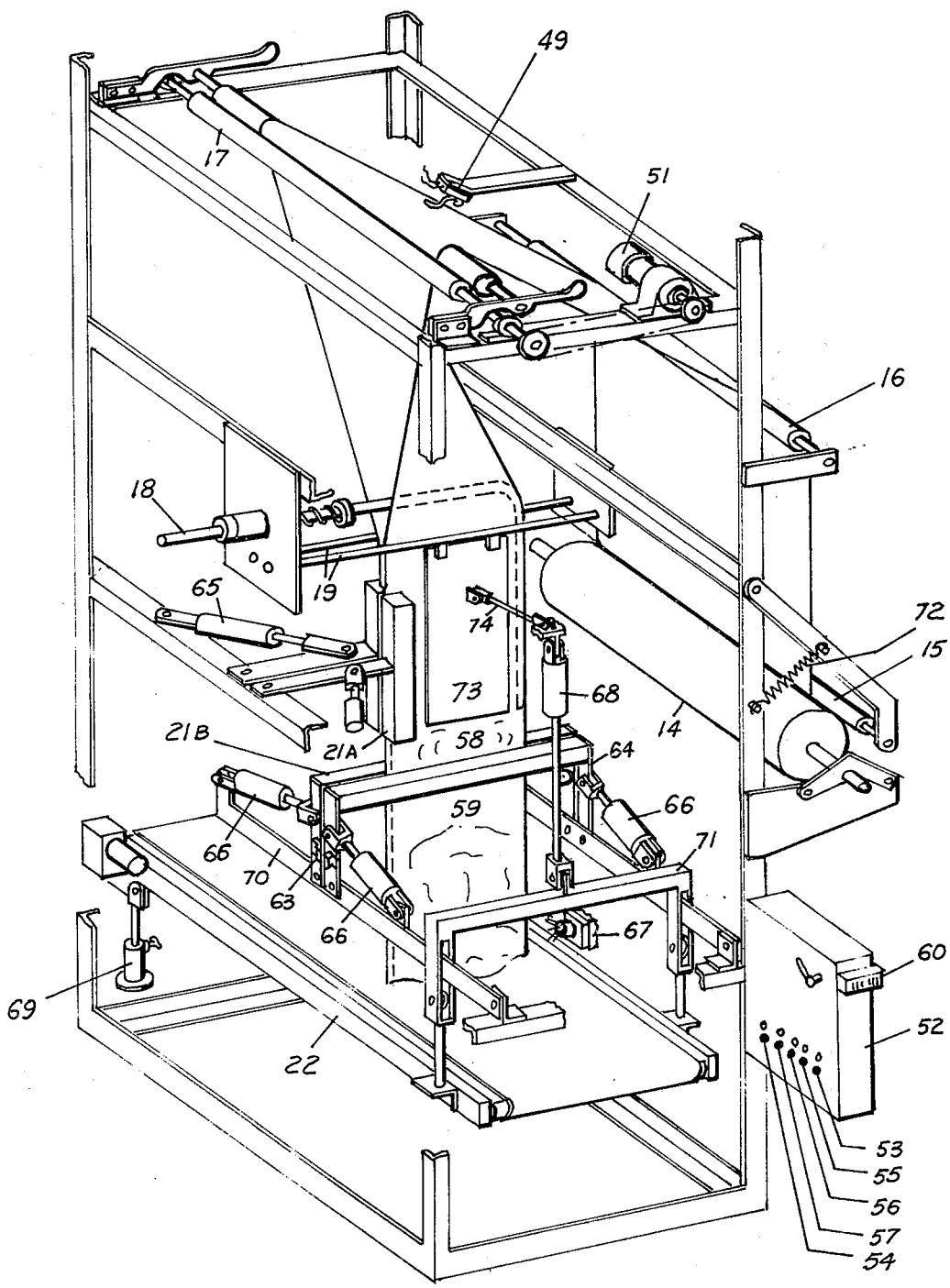
FIG. 5. Elevational view of bagger with the supply hopper, scale hopper and frame broken away.

The bag forming and sealing mechanism of the present invention is illustrated in FIGS. 5-7. The mechanism consists of the continuous sheet supply 14; the tension roller 15, influenced by a spring 72 to press against the said sheet supply 14; the idler roller 16, positionally adjusted to keep the continuous sheet travel under tension as monitored by feeler switch 49; the two sheet advancing rollers 17, powered by the brake motor 51 to advance the continuous sheet travel intermittantly as each bag is filled; the parallel combination of centerfold rod 18, and the pair of guide rods 19 to fold the continuous sheet longitudinally; the vertical and horizontal clamps 21A and 21B to clamp and seal the folded continuous sheet and the conveyor 22 is first raised by means of the air cylinder 68 to lift and thereby dilate the bag prior to filling and second remove the bag occupying the bag secondary position 59 after the said bag has been severed from the continuous sheet and released by the horizontal clamp 21B.

A control panel 52 is mounted on the frame of the bagger housing the start-stop switch 53; the counter preset switch 54; the tension feeler switch 55; the jaws test switch 56 and the conveyor drive test switch 57. Also within the control panel are the various time delays programmed in the bag forming, filling and sealing procedures.

In preparation for operation of the bagger, the plastic sheet is fed under the tension roller 15, over the idler roller 16 and inserted from above between the sheet advancing rollers 17. Once through the said sheet advancing rollers, the sheet is folded about its longitudinal centerline by the parallel-triangular spaced arrangement of centerfold rod 18 and the pair of guide rods 19, which are located below and disposed transversely to the said sheet advancing rollers 17.

The centerfold rod 18, positioned above and between the pair of guide rods 19, is bent to extend downwardly a distance equal to the length of the bag to be formed. The centerfold rod 18 is mounted for reciprocal movement, and is spring loaded to bear against the centerline of the folded plastic sheet. The said rod 18 will follow the centerline fold inwardly when the sides of the bag subsequently formed become distended during the filling process.

The pair of guide rods 19 serve to align the longitudinal edges of the train of folded plastic to pass between the jaws of the vertical clamp 21A and the horizontal clamp 21B. The length of the folded continuous sheet extending below the plurality of guide rods 19 to the horizontal clamp 21B, adjacent the bag forming position 58 is used to form the bag in the succeeding cycle of operation.

A shield 73 is moveably mounted to each guide rod 19, and extends downwardly the length of the bag forming position 58. The shield 73 is restrained from swinging outwardly more than the desired width of the bag by an adjustable rod 74.

The vertical clamp 21A and the horizontal clamps 21B are each activated by four double acting air cylinders, referred to collectively as 65 and 66 respectively. The normal position for the collective air cylinders is to hold the respective clamps open.

CLAMPS JAW FACES

The FIGS. 6-7 illustrate the construction for the left and right jaw faces typical for both the vertical and horizontal clamps 21A and 21B. The jaws are of tubular construction, and reinforced on the two sides, adjacent the jaw face, by steep strips which protrude a sufficient extent to form a retaining bracket. Sheet metal holders 77, holding the composite material making up the respective jaw face, are adapted to be retained by a press fit in the bracket. Each tubular jaw is also equipped with an air intake fixture 78 extending into the tubular cavity.

The sheet metal holder 77 for the left jaw face holds two rubber bumpers 79 separated by a rubber backed Teflon insert or other non-adhering composite material.

The left jaw face for the horizontal clamp 21A has a cutting wire 61 lying on the centerline of the Teflon insert 81.

The non-adhering composite 81 and rubber bumpers 79 extend the entire length of the jaw. Air vents connecting the air intake from the tubular cavity to the jaw face are located on each side of the cutting wire 61.

In the case of the left jaw face of the horizontal clamp 21B, a cutting wire 61 lies on top of the insert 81 along its center line. The cutting wire 61 is held in alignment by a spring leaf guide 86 and fixedly mounted at each end of the arm by a conducting bracket 87. A circuit means (leads only shown) connected to the control panel 52 energizes the conducting bracket 87 and thereby energize the cutting wire 61 for cutting the folded continuous sheet. The cutting wre 61 is held in alignment by the spring lead guides 86 mounted at each end of the tubular clamps.

The sheet metal holder 77 for the right jaw face, typical for both the horizontal clamps 21A and the vertical clamp 21B, also holds two rubber bumpers 79, but these are separated by solid Teflon or non-adhering composite inserts 82, which in turn are spaced apart. The Teflon inserts 82 each have a flat heating wire 62 lying along the centerline. The inserts 82, the wires 62, and the rubber bumpers 79, extend the length of the right jaw. The flat heating wire 2 and the insert 82 are covered by the cloth 83 throughout their length. (Shown only in cross section.) The sides of the cloth 83 are anchored between the insert 82 and the rubber bumper 79; the cloth 83 portion covering the space between the solid inserts is held fixed by a holding wire 84. The cloth 83 cover is essential to keep the jaws from adhering to the folded continous sheet during the heating and sealing process. The flat heating wires 62 are also a part of a circuit means (leads only shown) connected to the control panel 52 which energizes the conducting bracket 88 and thereby the heating wires 62. The flat heating wires 62 are fixedly mounted at each end of the tubular clamps by a bracket 88 and held in alignment by the spring lead guides 86.

The wires 62 on the centerline of each of the spaced inserts 82 of the right jaw face will, when heated, fuse the thermoplastic sheet and by reason of the pressure of abutment with the opposing insert 81 of the left jaw face a seam or weld will be formed.

The cooling of the seal is accomplished by the air taken into the tubular cavity directed at the seal by the air vents in the jaw face.

The jaw supports members 64 have the magnetic feed switch 63 mounted in a predetermined relationship to each other. It is the function of the magnetic switch to prevent the opposing jaws from closing should any obstruction inadvertently or otherwise be placed between them.

BAG ADVANCEMENT AND REMOVAL COMPONENTS

The bag advancement and removal components are shown in FIGS. 1 and 5. These components consist of the sheet advancing roller 17 powered by brake motor 51, the horizontal clamp 21B and the conveyor 22. The bag, yet connected to the folded continuous sheet, is advanced from the bag forming position 58 to the bag secondary position 59 by the powered sheet advance rollers 17. This advance is made under tension induced in the folded continuous sheet by the effects of gravity upon the free swinging, newly formed and filled bag. In the bag secondary position 59 the open end of the bag is clamped by the horizontal clamp 21B for the purpose of sealing the open end and severing the bag from the folded continuous sheet. Thereafter, upon release by the horizontal clamp 21B the completed bag falls upon conveyor 22 and is removed.

OPERATION

The operation of the bagger is initiated by depressing the start-stop switch 53 on control panel 52.

The balance beam, while the scale hopper 12 is still empty, will swing to the lowest position, it will, come to rest on the lower stop of the beam travel restraint 50. In this position the beam upper contactor 42 and lower contactor 43 will engage the fast fill contactor 45 and dribble contactor 46 respectively. The double acting air cylinders 25 and 26 will then be activated to open the fast fill gate 23 and dribble gate 24. Thereupon material will flow from the supply hopper 11 into the scale hopper 12. The flow of material from the supply hopper 11, induced by gravity, will be accelerated by the vibratory feeder 27 situated on the underside of the supply hopper 11.

As the weight of material in the scale hopper 12 is increased, a counterbalance with the near weight 37 will be reached; the supporting arm of the balance beam will swing upwards disengaging the beam upper contactor 42 from the fast fill contactor 45. This opening of the respective circuitry serves to reverse the air in the air cylinder 25 and close the fast fill gate 23. However, the lower contactor 43 will continue to engage dribble contactor 46, keeping the dribble gate 24 open.

Simultaneously, the upward swinging of the balance arm will lift the dribble weight 39 from the pedestal 48 by means of the inverted T shaped pick up connector 47. As the consequence of the added weight of the dribble weight 39, the engagement of the beam lower contactor 43 and the dribble contactor 46 will be secured until the additional dribble weight 39 is counterbalanced by the additional weight of material in the scale hopper 12.

When the weight of material in the scale hopper 12 counterbalances, the combined near weight 37 and the dribble weight 39, the lower beam contactor 43 becomes disengaged from dribble contactor 46 and the double acting air cylinder 26 closes the dribble gate 24.

The closure of the dribble gate 24 initiates a one second time delay.

After the expiration of the one second delay, the air pressure in the four double acting air cylinders 65 is reversed, closing the vertical clamps 21A, and the air pressure is also reversed in the four double acting cylinders 66, closing the horizontal clamps 21B.

As the air pressure builds up in the new direction, the clamps 21A and 21B will firmly clamp the folded plastic train in bag forming position 58. The conveyor 22 will then be raised by the air cylinder 68 and abut and lift the plastic bag in the secondary position 58, thereby relieving the strain induced in the continuous sheet by the horizontal clamps 21B. The continued upward travel of the conveyor 22 engages the support for the horizontal jaw 21A.

Consequently the bag held by the horizontal clamp 21B is lifted and the stress induced in the continuous sheet by the clamps is relieved and the bag is dilated to receive the flow of material from the scale hopper 12.

After certain conditions are satisfied, namely that the photo cell 62 has sensed that the previously filled plastic bag has been lowered to the secondary position 59, and the sheet feeler switch 49 has sensed that the folded continuous sheet travel is under proper tension, and the dump gate 29 has opened, then only will the material flow from the scale hopper 12 through the chute 28 and into the bag formed in position 58. The flow of material into the said bag is accelerated by the vibratory feeder 32.

Immediately after the air pressure built up has occurred in the air cylinders 65 & 66 and the vertical clamp 21A and the horizontal clamp 21B have firmly clamped onto the continuous sheet, a two second time delay is effected for the heating or seam welding cycle.

The longitudinal edges of the folded continuous sheet, clamped in the vertical clamp 21A are sealed by the heated wires 62 of the right jaw face.

The length of the parallel double seam made by the vertical right jaw face of vertical clamp 21A extends the length or height of the bag to be formed plus a length equal to the vertical distance separating the vertical clamp 21A from the horizontal clamp 21B. The additional length of the double seam is the overlap or preseal necessary to complete the sealing of the longitudinal seal for the succeeding bag to be formed. The overlap or preseal accomodates the upward travel of the horizontal clamp 21B in the stress relieving and dilating process.

The sides of the folded plastic train, transversely clamped by the horizontal clamp 21B, are sealed by double seams by the heated wires 62 of the respective right clamp face. Thereafter, the heated cutting wire 61 of the left jaw face is applied between the two seals to sever the bag in the secondary position 59 from that in position 58.

A three second cooling cycle follows directly upon the heating cycle. The cooling cycle consists of air blasts directed by the air vents in the respective jaws against the seals or welds made.

Only after both the scale hopper 12 has been emptied and the three second cooling cycle has expired, will an air reversal take place in the four air cylinders 66, in the four air cylinders 65 and in the air cylinder 68; thereupon the vertical clamp 21A and the horizontal jaw 21B will be opened, releasing both bags in position 58 and 59, and also the conveyor 22 will be lowered.

The filled and completely sealed plastic bag from the secondary position 59, no longer attached to the folded continuous sheet, falls unto conveyor 22. The conveyor belt 22 moves the released bag a given distance (approximately four (4) feet) beyond the range of the photo cell 67. The filled and partially sealed plastic bag from the bag forming position 58, yet contiguous to the folded continuous sheet, is lowered to the bag secondary position 59.

As aforementioned the longitudinal edges of the folded continuous sheet are in each instance sealed or welded together a length longer than necessary for the vertical side of the bag formed. The excess length is necessary to accomodate the distance the horizontal clamp 21B is raised. Consequently, when the newly formed bag is lowered to the bag secondary position 59, the presealed overlap along the longitudinal edge extends above the horizontal clamp 21B a length slightly in excess of the vertical distance between the said horizontal clamp 21B and the vertical clamp 21A.

It is to be noted that once the scale hopper 12 is emptied, the balance beam will again swing to the lowest position, that is, again come to rest on the lower stop of the beam travel restraint 50. In this position the upper contactor 42 and the lower contactor 43 will again be engaged by the fast fill contactor 45 and dribble contactor 46 respectively. However, at this time, only the air cylinder 31 will be activated and will close the dump gate 29. The fast fill gate 23 and the dribble gate 24, notwithstanding the engagement of the respective contactors, will not be opened to refill the scale hopper 12 until two conditions have been satisfied, namely that the photo cell 67 has sensed that a bag has been lowered to the secondary position 59, and second, that the sheet feeler switch 49 has sensed the tension in the continuous sheet occasioned by lowering the newly formed and filled bag to the bag secondary position 59.

The procedure of weighing, clamping, filling and sealing the plastic bags is repeated until the number preset on Counter 60 has been accomplished. However, in each instance certain conditions must be satisfied; in summary these are;

A. Before the fast fill gate 23 and dribble gate 24 will open to permit material to flow into the scale hopper 12;
1. The previously filled and completely sealed bag must be transported beyond the range of the photo cell 67; and,
2. The sheet feeler switch 49 must sense a proper amount of tension in the folded continuous sheet feed.

B. Before the dump gate 29 will open to permit material to flow into the plastic bag in the bag forming position 58;
1. The weight of the material in the hopper 12 must equal the predetermined weight,
2. The air pressure must build up in the air cylinders 65 and 66 respectively to effect a tight clamp of the continuous sheet by the vertical jaw 21A and the horizontal clamp 21B, and
3. The conveyor 22 must be raised a sufficient distance to engage the horizontal clamp support and dilate the bag clamped by horizontal clamp 21B.

C. The plastic bag in the secondary position 59 cannot be released from the horizontal clamp until:
1. The scale hopper 12 has been emptied of all material; and,
2. The three second heating cycle has expired.

While a specific embodiment of the invention has been shown and described in detail to illustrate the application of the principles of the invention, it will be understood that the invention may be embodied otherwise without departing from such principles.

What is claimed is:

1. A bagger for forming a bag from a single continuous sheet of thermoplastic material comprising in combination a means for folding said sheet lengthwise about the mid-axis, a first clamping means for holding the vertical edges of the said folded sheet together over a length exceeding the contemplated bag length, a second clamping means mounted for upward travel in the plane of the said first clamping means to hold the said folded sheet transversely when at the lowest point of travel; the said first and said second clamping means forming a clamp-held bag with an open upper end appended to the said folded sheet and a non-held vertical side portion extending downward from the said first clamping means to the said second clamping means the edges of the said non-held vertical side portion having been sealed together by the said first clamping means in the preceding cycle of operation, a means to raise the second clamping means and thereby dilate the said clamp-held bag, a means for filling the said clamp-held bag a content of predetermined weight, a means to apply heat through the said first and said second clamping means to form a vertical side and a plurality of lower transverse seals, a slitting means to cut the material between the plurality of transverse seals, a means to apply blasts of air to cool the seals formed, whereupon the opening of the said first and said second clamping means, the said bag appended to the said folded sheet is released, and a power roller means to lower the said appended bag a bag length to present a similar given length of the said folded sheet to the said first and second clamping means for the succeeding cycle of operation with the leading vertical edges of the said folded sheet having been presealed as the consequence of the said first clamping means positioned to generate a length of seal exceeding the bag length in the immediate cycle of operation which overage is positioned by the bag length lowering of the said folded sheet.

2. A bagger of claim 1 wherein the said folding means is comprised of the parallel combination of a centerfold rod and a pair of guide rods; the said centerfold rod positioned above and between the said pair of guide rods and is constructed to extend downwardly a distance equal to the length of the bag to be formed; the said centerfold rod is spring loaded to apply a resisting force against the closing of the open side of the formed bag during the filling process.

3. A bagger comprising in combination a supply roll of single continuous sheet of material, a means, perpendicular to the axis of the said supply roll, for folding a given length of the said sheet longitudinally, a vertical and transverse clamping and sealing means to clamp together the vertical aligned edges and to clamp transverse across said folded sheet to form a clamp-held bag having a non-clamped but presealed lower vertical side interposed between said two clamping means and having an open upper horizontal side appended to the said folded sheet; the said transverse clamping and sealing means concurrently clamping the upper open horizontal side of the bag previously formed, sealed and filled, and yet appended to the said folded sheet, a lift and transport means operatively engaging the said transverse clamping and sealing means for upward travel to dilate the said clamp-held bag and concurrently supporting the said appended bag previously formed, sealed and filled, a means to fill the clamp-held bag a content of predetermined weight, whereupon the application of heat and pressure through the said vertical and said transverse clamping and sealing means, the clamped portion of the bag, are sealed; a second parallel-transverse seal is applied by the said transverse clamping and sealing means closing the upper end of the said appended bag previously formed, sealed and filled, a slitting means to cut the appendage between said parallel transverse seals, whereupon the opening of the said clamping and sealing means results in said previously formed bag falling upon the said lift and transport and removed from the bagger with the immediate bag yet appended to the said continuous single sheet swinging free, a powered roller means operatively engaged to lower the said immediate bag a sufficient distance for the bottom thereof to abut the said lift and transport means and the lowering concurrently providing a sufficient length of the said folded sheet to form a succeeding bag, as the consequence, the preceding, immediate and succeeding cycles of operation to form, fill and seal bags are each interdependent on the said vertical clamping and sealing means to preseal the aligned leading vertical edges of the said folded sheet for each succeeding cycle of operation, the said presealed leading vertical edge being of sufficient length to furnish an overlap to be clamped by each of the said respective vertical and the said transverse clamping and sealing means, 4. A bagger of claim 3 wherein the said clamping and sealing means consists of a right jaw having a face comprising a plurality of elongated rubber bumpers separated by a plurality of non-adhering composite inserts which in turn are held in spaced relationship with each other, a plurality of heating wires affixed to the centerline of each of the said non-adhering inserts; a left jaw face comprising a plurality of elongated rubber bumpers interspersed by a non-adhering composite inserts with a heating wire affixed to the common centerline of the said non-adhering composite inserts and the said left jaw face, whereupon the application of energy to the said heating wires, the said heating wire of the said left jaw face will sever the material which it is in contact and move into the recess formed by the spaced non-adhering inserts on the said right jaw face; whereas the said heating wires of the said right jaw face will melt the material to which they are pressed and by reason of the abutment with the said rubber bumpers of the said left jaw face form a seal.

5. A method for forming a plurality of filled bags from a continuous single sheet of plastic material consisting of folding a predetermined length of the said sheet of plastic material; clamping together both the open vertical side and the bottom horizontal side to form an appended bag having an open horizontal top side; dilating the said appended bag by raising the clamped bottom horizontal side; the length of the vertical side over which the clamped horizontal bottom side is raised having been presealed in the previous cycle of operation; filling the clamp-held bag with a predetermined weight of material; sealing and cooling the sides of the clamp-held bag and simultaneously sealing the top horizontal side of the previously formed bag; and cutting the connection between the two horizontal seals and thereby severing the said previously formed bag from the said clamp-held bag; the said previously formed bag, upon release from the clamp, falls and is removed from the bagger, whereas the said previously clamp-held bag is lowered to a sufficient distance by means of power driven rollers to present a similar given length of said folded plastic material also with the said leading vertical side edges presealed and clamped for the formation of the succeeding bag.

6. A bagger for forming a bag from a single continuous sheet comprising in combination a folding guide means to fold the said continuous sheet longitudinally;

a plurality of clamping means with first and second components in a right angular relationship, the said first or perpendicular component a fixed distance above the said second or adjacent component; the said plurality of clamping means below the said folding guide means and aligned to receive and clamp the said folded sheet;

a lifting means to stress relieve the clamped transverse side of the said folded sheet by lifting the said second or adjacent component vertically within the distance separating the said first or perpendicular component and the said second or adjacent component;

a first sealing and cooling means incorporated in the said first or perpendicular component of the said plurality of clamping means to form a single seam along the clamped vertical edges and a second sealing and cooling means incorporated in the said second or adjacent component to form a double seam along the clamped transverse sides of the said folded sheet;

a slitting means to divide and separate the double seam into the seal for bottom side of the instantly formed bag and the seal for the top side of the previously formed bag, the said slitting means thereby cutting the connection of the said previously formed bag with the said folded sheet;

whereupon the release of the said plurality of clamping means the said previously formed bag is freed for removal from the bagger and the said instantly formed bag is lowered by means of the said folded sheet a fixed distance to present sufficient length of the said folded sheet across the said plurality of clamping means to form a succeeding bag.

* * * * *